United States Patent [19]

Bill et al.

[11] 4,335,190

[45] Jun. 15, 1982

[54] THERMAL BARRIER COATING SYSTEM HAVING IMPROVED ADHESION

[75] Inventors: Robert C. Bill, Rocky River; James S. Sovey, Strongsville, both of Ohio

[73] Assignee: The United States of America as represented by the Administrator of the National Aeronautics and Space Administration, Washington, D.C.

[21] Appl. No.: 229,233

[22] Filed: Jan. 28, 1981

[51] Int. Cl.³ .................. B32B 15/04; B21D 39/00
[52] U.S. Cl. .................... 428/623; 428/633; 428/678; 427/34; 427/405; 427/419.2; 427/423
[58] Field of Search .............. 427/34, 405, 419.2, 427/423; 428/404, 633, 652, 654, 667, 661, 678, 679, 685, 623

[56] References Cited

U.S. PATENT DOCUMENTS

| | | | |
|---|---|---|---|
| 3,192,892 | 7/1965 | Hanson et al. | 427/38 X |
| 3,287,243 | 11/1966 | Ligenza | 204/192 |
| 3,927,223 | 12/1975 | Takabatake et al. | 427/34 |
| 3,976,809 | 8/1976 | Dowell | 427/34 |
| 3,977,660 | 8/1976 | Nakahira | 427/34 X |
| 3,989,872 | 11/1976 | Ball | 427/34 X |
| 4,055,705 | 10/1977 | Stecura et al. | 427/34 X |
| 4,248,940 | 2/1981 | Goward et al. | 427/34 X |
| 4,273,824 | 6/1981 | McComas et al. | 427/34 X |

*Primary Examiner*—Michael R. Lusignan
*Attorney, Agent, or Firm*—Norman T. Musial; John R. Manning; Gene E. Shook

[57] ABSTRACT

This invention is directed to an improved thermal barrier system by improving the adherence between a ceramic thermal barrier coating and a metal bond coating. First a primer film is deposited on the bond coat by ion sputtering a ceramic film thereon. A ceramic thermal barrier coating is then plasma-sprayed onto this primer film. This improves the integrity and strength of the interface between the plasma-sprayed ceramic layer and metallic bond coat which insures stronger adherence between the metal and the ceramic.

10 Claims, No Drawings

THERMAL BARRIER COATING SYSTEM HAVING IMPROVED ADHESION

DESCRIPTION

ORIGIN OF THE INVENTION

The invention described herein was made by employees of the United States Government and may be manufactured and used by or for the Government for governmental purposes without the payment of any royalties thereon or therefor.

TECHNICAL FIELD

This invention is concerned with thermal barrier coating systems which utilize ceramic coatings on metallic substrates for low thermal conductivity. The invention is particularly directed to strengthening the adherence of the coatings by improving the integrity of the interfaces between the plasma-sprayed ceramic layers and the metallic bond coats employed in plasma-sprayed thermal barrier coating systems.

Thermal barrier coating systems of the type described in U.S. Pat. No. 4,055,705 utilize a ceramic material that is plasma-spray deposited directly onto a plasma-sprayed metallic bond coat. Several problems have been encountered in using these coatings. For example, the molten ceramic particles that impinge onto the metallic bond coat are rapidly quenched on the side adjacent to the bond coat. This results in a tendency to "peel-up" as the solidification front propogates through the particles. Also, the adhesive bond that forms between the ceramic particles and the metallic bond coat surface is inherently weaker than a ceramic/ceramic cohesive bond.

BACKGROUND ART

Takabatake et al U.S. Pat. Nos. 3,927,223, Dowell 3,976,809, and Nakahira 3,977,660 are all directed to plasma spraying substrates, which are preferably metallic with a ceramic primer coat. Thereafter, a ceramic finish coat is applied by plasma spraying.

Hanson et al U.S. Pat. Nos. 3,192,892 and Ligenza 3,287,243 describe concepts for coating substrates, which are preferably metallic, with ceramic materials deposited by sputtering. However, neither of these patents is concerned with depositing on the sputter coated ceramic material a second ceramic coat which is sprayed by a plasma jet.

DISCLOSURE OF INVENTION

According to the present invention metallic bond coatings are deposited on the surfaces of metal substrates which are to be protected. A primer film of a ceramic material is sputter-deposited onto the metallic bond coating. A ceramic thermal barrier coating is then plasma sprayed onto the primer film. In a more narrow aspect, the metallic bond coat is first cleaned by ionic bombardment. The primer coat of ceramic material is then deposited by sputtering in the presence of oxygen which results in reactive sputtering.

DETAILED DESCRIPTION OF THE INVENTION

As previously described a metal substrate, such as a turbine blade, is covered with a metallic bond coating. The metal substrate is preferably a nickel-base or a cobalt-base superalloy. However, dispersion-strengthened alloys, composites, and directional eutectics may be protected in accordance with the invention.

The metallic bond coating of NiCrAlY or CoCrAlY is preferably deposited on the surface of the substrate by plasma spraying as described in U.S. Pat. No. 4,055,705. However, it is contemplated that cladding, slurry spray, and sintering may be used for applying the metallic bond coating to the substrate. A bond coating of NiCrAlY having a thickness between about 0.003 inches and 0.007 inches has given satisfactory results.

A plasma spray deposited metallic bond coating of NiCrAlY applied to a metal substrate provided a test surface to be coated. Sputter deposition of yttria stabilized zirconia was performed using a 10 cm diameter argon ion beam from an electron bombardment ion source of the type developed from electric propulsion technology. Such an ion source is described in "Advanced in Electronics and Electron Physics" by H. R. Kaufman, vol. 36, pages 365–373. Beam extraction was accomplished by a dished, two-grid ion optics system. Such a system is described in AIAA Paper No. 76-1017 entitled "A 30 cm Diameter Argon Ion Source". Neutralization of the ion beam was achieved by using a plasma bridge neutralizer.

This electron bombardment ion source was located in a vacuum facility which was sufficiently large to minimize back sputtered facility material from contaminating the surfaces. The pressure of the vacuum facility was changed periodically during operation of the ion source.

A sputter target was initially ion sputter cleaned for about 2.5 hours at an ion beam energy of about 1200 eV and an ion current density of about 0.5 mA/cm$^2$. The pressure in the vacuum facility was about $5 \times 10^{-5}$ torr.

The substrate was then outgassed at a pressure of $5 \times 10^{-7}$ torr. This outgassing lasted for about 45 minutes. The sputter target was then ion sputter cleaned again for about 5 minutes. The substrate was ion-cleaned for about 5 minutes at 1200 eV and 0.5 mA/cm$^2$.

The zirconia sputter target had a diameter of about 15 centimeters and was positioned about 15 centimeters from the ion source at an angle of about 45° with respect to the ion beam. The metal substrate having the bond coating plasma sprayed thereon was positioned in the vacuum facility outside of the ion beam envelope and parallel to the sputter target. The substrate was separated from this target by about 15 centimeters. Air was introduced into this vacuum chamber until the pressure reached $1 \times 10^{-3}$ torr. The zirconia was sputter-deposited at 1300 eV and 0.5 mA/cm$^2$ for about 18½ hours. This produced a zirconia film having a thickness of about 1.5 μm. The air was partially disassociated and ionized by electrons in the ion source discharge chamber and by ions in the beam which provided free oxygen to enhance film stoichiometry.

The substrate having the metal bond coating and primer film thereon was removed from the vacuum facility. A ceramic thermal barrier coating was then deposited on the primer film by plasma spraying in the manner described in U.S. Pat. No. 4,055,705.

Each test sample was tested in a cyclic thermal shock rig. Thermal cycles were imposed on the samples until spalling of the plasma-sprayed ceramic layer occurred. These tests demonstrated that the plasma-sprayed yttria stabilized zirconia was more strongly adherent to plasma-sprayed NiCrAlY bond coated substrates that had been sputter-primed with yttria stabilized zirconia than to otherwise similar specimens without the sputtered prime coat. In one configuration of the invention, a five to six fold improvement in cyclic thermal shock life was demonstrated for specimens that had been sputter-primed.

In an alternate embodiment of the invention RF sputter deposition of the yttria stabilized zirconia or other ceramic material is used. In such an embodiment sputter deposition is carried out in an argon environment at about 15 μm Hg absolute pressure, 250 w forward power to a 15 cm target, 3.5 cm separation between target and substrate yielding a $ZrO_2$ deposition rate of about 0.25 μm/hour.

While yttria stabilized zirconia ($ZrO_2$ $Y_2O_3$) has given satisfactory results, the ceramic to be deposited may be calcia stabilized zirconia ($ZrO_2$-CaO) or magnesia stabilized zirconia ($ZrO_2$ MgO) or, in general, any ceramic material. Also, the metallic substrate may be other than a plasma-sprayed metallic bond coating. It is contemplated that any specifically roughened, porous, of otherwise prepared metallic surface may be used.

While several embodiments of the invention have been described it will be appreciated that various modifications may be made without departing from the spirit of the invention or the scope of the subjoined claims.

We claim:

1. A coated article of manufacture having a thermal barrier coating system comprising
   a substrate selected from the group consisting of nickel- and cobalt-based superalloys, dispersion-strengthened alloys, composites, and directional eutectics,
   a bond coating consisting essentially of a material selected from the group consisting of NiCrAlY and CoCrAlY covering said substrate, said bond coating having an ion sputter cleaned surface,
   a primer film consisting essentially of $ZrO_2$ stablized with another oxide bonded to said textured surface, and
   a ceramic thermal barrier coating bonded to said primer film.

2. The thermal barrier coating system of claim 1 wherein said primer film and said ceramic thermal barrier coating are the same material.

3. The thermal barrier coating system of claim 2 wherein said primer film is stabilized with a material selected from the group consisting of yttria, calcia, and magnesia and has a thickness of about 1.5 μm.

4. The thermal barrier coating system of claim 3 wherein said primer film and said thermal barrier coating are selected from the group consisting of $ZrO_2$-$Y_2O_3$, $ZrO_2$-MgO, and $ZrO_2$-CaO.

5. the thermal barrier coating system of claim 4 wherein said primer film and said thermal barrier coating are yttria stabilized zirconia.

6. A method of coating surfaces of nickel-base and cobalt-base superalloys, dispersion-strengthened alloys, composites, and directional eutectics comprising the steps of
   depositing a bond coating of an alloy selected from the group consisting of nickel-base alloys and cobalt-base alloys on said surfaces,
   Sputter depositing a primer film of a ceramic material onto said bond coating, and
   plasma spraying a thermal barrier coating of a ceramic material onto said primer coating whereby the integrity and strength of the interface between said primer film and said thermal barrier coating are improved, thereby improving the adherence of the thermal barrier coating systems to said surfaces.

7. The method of coating metal surfaces as claimed in claim 6 wherein the ceramic material of the primer film is sputter-deposited to a thickness of about 1.5 μm, and
   the same ceramic material is then plasma sprayed onto said primer film thereby forming the thermal barrier coating system having improved adherence at the interface.

8. The method of coating metal surfaces as claimed in claim 7 wherein the ceramic material is zirconia stabilized with another oxide.

9. The method of coating metal surfaces as claimed in claim 8 wherein said bond coating is ion cleaned prior to sputter-depositing said ceramic primer film.

10. The method of coating metal surfaces as claimed in claim 9 wherein the zirconia is sputter-deposited at 1300 eV and 0.5 mA/$cm^2$ for about 18.5 hours.

* * * * *